United States Patent [19]

Maheu

[11] 4,263,472
[45] Apr. 21, 1981

[54] ELECTRICAL BOX

[76] Inventor: Joseph S. Maheu, 10 Ruddington Dr., Apt. 10 North, #307, Willowdale, Ontario, Canada, M2K 2J7

[21] Appl. No.: 45,505

[22] Filed: Jun. 4, 1979

[30] Foreign Application Priority Data

May 23, 1979 [CA] Canada .................................. 328174

[51] Int. Cl.³ ............................................. H02G 3/08
[52] U.S. Cl. ........................................ 174/51; 174/57; 174/58; 220/3.7; 220/3.92; 220/3.94
[58] Field of Search ....................... 174/57, 58, 53, 51; 220/3.9, 3.92, 3.94, 3.7, DIG. 25

[56] References Cited

U.S. PATENT DOCUMENTS

| 935,915 | 10/1909 | Klins | 220/3.92 |
|---|---|---|---|
| 1,024,902 | 4/1912 | Kronberger . | |
| 1,113,092 | 10/1914 | Beugler . | |
| 1,592,990 | 7/1926 | Raquette et al. | 220/3.92 |
| 2,265,926 | 12/1941 | Pike . | |
| 2,299,674 | 10/1942 | Austin, Jr. | 220/3.9 X |
| 2,488,710 | 11/1949 | Cooper . | |
| 2,639,054 | 5/1952 | Austin, Jr. | 220/3.92 |
| 2,808,172 | 10/1957 | Buckels . | |
| 2,917,199 | 12/1959 | Appleton . | |
| 2,943,757 | 7/1960 | Kaden | 220/3.9 |
| 3,386,606 | 6/1968 | Pastrick | 220/3.94 |
| 3,662,085 | 5/1972 | Robinson et al. . | |

FOREIGN PATENT DOCUMENTS

| 154189 | 11/1953 | Australia | 174/57 |
|---|---|---|---|
| 9560 | of 1905 | United Kingdom | 220/DIG. 25 |

Primary Examiner—Allan N. Shoap
Attorney, Agent, or Firm—Rogers, Bereskin & Parr

[57] ABSTRACT

An electrical box is described. According to one aspect of the invention, the back, top and bottom walls of the box are formed in one piece and have inwardly directed side flanges to which separate side plates are attached by screws. According to another aspect of the invention, the top and bottom walls of the box are fitted with U-shaped spacer elements which protrude from the box and form abutments against which a receptacle secured to the box is held. By adjusting the positions of the spacer elements, the final position of the receptacle can be varied, e.g. to compensate for inaccuracies in positioning of the box.

6 Claims, 6 Drawing Figures

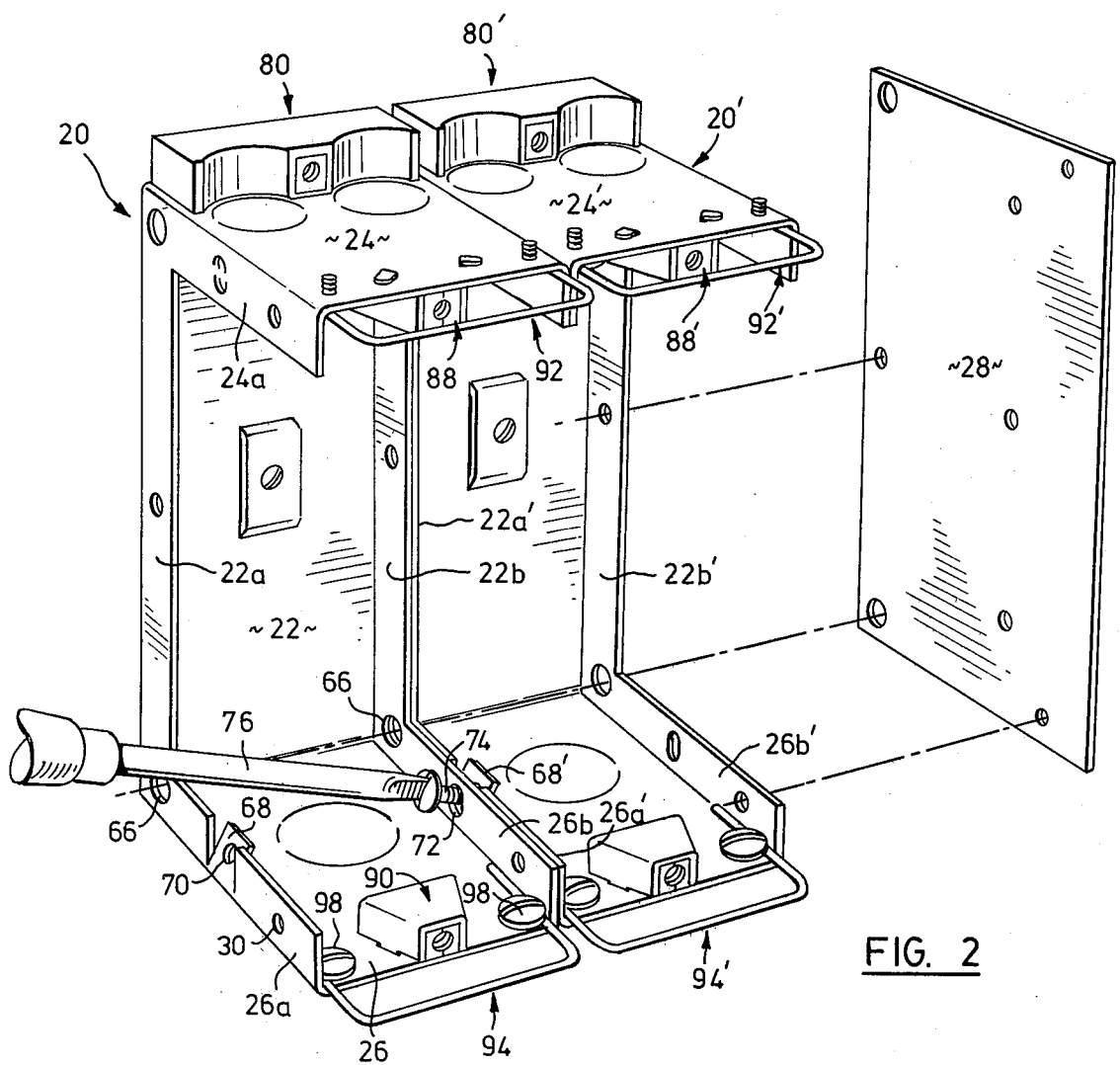
FIG. 2
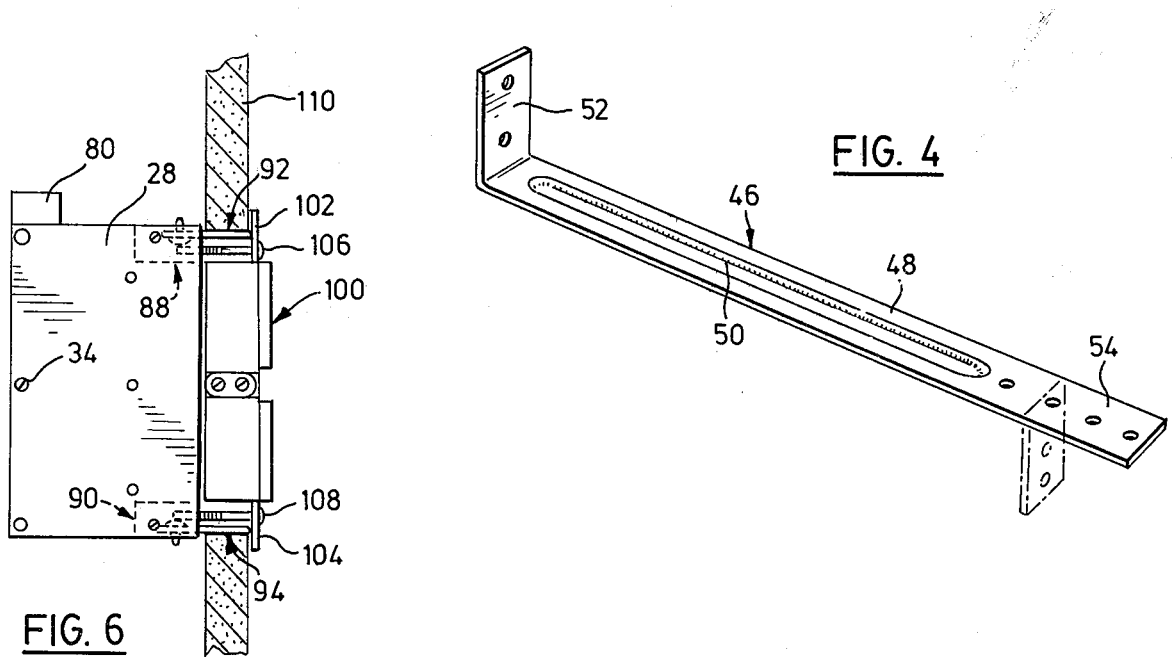
FIG. 6
FIG. 4

ELECTRICAL BOX

This invention relates to electrical boxes used for mounting receptacles, switches and the like.

Electrical boxes used for interior domestic wiring conventionally have a back wall and top and bottom walls formed in one piece by transversely bending a flat steel sheet. Side walls of the box are formed by separate metal plates, each of which typically clips onto the top or bottom (end) wall of the box and is held against the opposite end wall by a screw. Thus, each side plate is formed at one end with a tab intended to co-operate with a similar tab projecting outwardly from one end wall of the box. When the tabs have been engaged, the side plate can be brought down against the side of the box and held in place by a screw which projects through a tab on the opposite wall of the box so that its shank bears against the outer face of the side plate.

A disadvantage of this type of box is that there is a risk that one or both of the side plates may become detached from the box thereby exposing the wiring inside the box. For example, due to manufacturing imperfections, the interfitting tabs on the end wall of the box and the side plate may not form a firm connection. Even where there is no manufacturing defect, the operation of fitting the side plates is awkward and may result in improper installation. In any event, practical experience has shown that the side plates of boxes of this type are prone to becoming detached in use. For this reason, this type of box is not approved for use with exterior wiring. Even when used with interior wiring, electrical codes prohibit mounting of the box using a side plate only; for side mounting, it is necessary to use a long nail which extends right through the box by way of openings in the side plates.

Receptacles, switches and the like are attached to this type of box by screws which extend rearwardly from the receptacle or the like and are screwed into openings in tabs which project from the top and bottom walls of the box either outwardly or inwardly depending on the type of box. The receptacle may be mounted flush against the front of the box (in contact with the outer edges of the top and bottom walls). More usually, however, the box is mounted behind an opening in a drywall surface and the receptacle is held against the external surface of the drywall, with its attachment screws passing through the opening in the drywall to the mounting tabs on the box. While this arrangement is satisfactory where the box is properly installed with its front edges parallel to the outer surface of the drywall and where the edges of the drywall around the opening are firm, in practice this is seldom the case. If the box is improperly installed, the receptacle will not be drawn back evenly against the drywall when its mounting screws are tightened. Also, the drywall may tend to break away around the opening. Both of these conditions necessitate the use of packing washes or pieces of drywall to produce an acceptable installation. Obviously, this is very time-consuming and inefficient and does not lead to an end result which is entirely satisfactory.

An object of the present invention is to provide improvements in electrical boxes intended to avoid these problems.

According to a first aspect of the invention there is provided an electrical box made up of a base member shaped to define a back wall, top and bottom walls formed integrally with the back wall and extending outwardly from the back wall generally normal thereto, and two initially seperate plain rectangular side plates for forming sides of the box. Each of the back wall and top and bottom walls has inwardly directed integral flanges along both sides and the flanges of the respective walls at each side of the base member co-operate to define attachment faces for said side plates. Each of the flanges is formed with at least one screw threaded opening which aligns with a corresponding plain opening in the relevant side plate and receives a screw rigidly clamping the side plate to the flange, so that the side plates and base member together define an integrated structural box capable of being secured to a support by way of either of said side plates.

According to another aspect of the invention there is provided an electrical box which has a back wall, top and bottom walls extending outwardly from the back wall generally normal thereto and two side walls extending between the top and bottom walls and forwardly from the back wall, said walls together defining an enclosure for receiving electrical wiring and the like and having an open front. Means is provided on each of the top and bottom walls for receiving a screw to secure an electrical receptacle and the like across the open front of the box. Adjustable positioning means is also provided on each of said top and bottom walls for spacing the receptacle and the like from said walls. Each of said positioning means includes a spacer element extending outwardly from the relevant wall of the box and presenting an end face disposed generally parallel to an outer edge of the wall and against which a receptacle and the like abuts when secured across the open front of the box by said screw receiving means. Means is also provided for adjustably clamping the element to said wall of the box so that the position of said end face of the element can be adjusted with respect to said wall for appropriately positioning said receptacle.

In order that the invention may be more clearly understood, reference will now be made to the accompanying drawings which illustrate a preferred embodiment of the invention by way of example, and in which:

FIG. 2 is a perspective view showing the box of FIG. 1 "ganged" with a second similar box;

FIG. 4 is a perspective view of part of FIG. 3;

Figure 1:
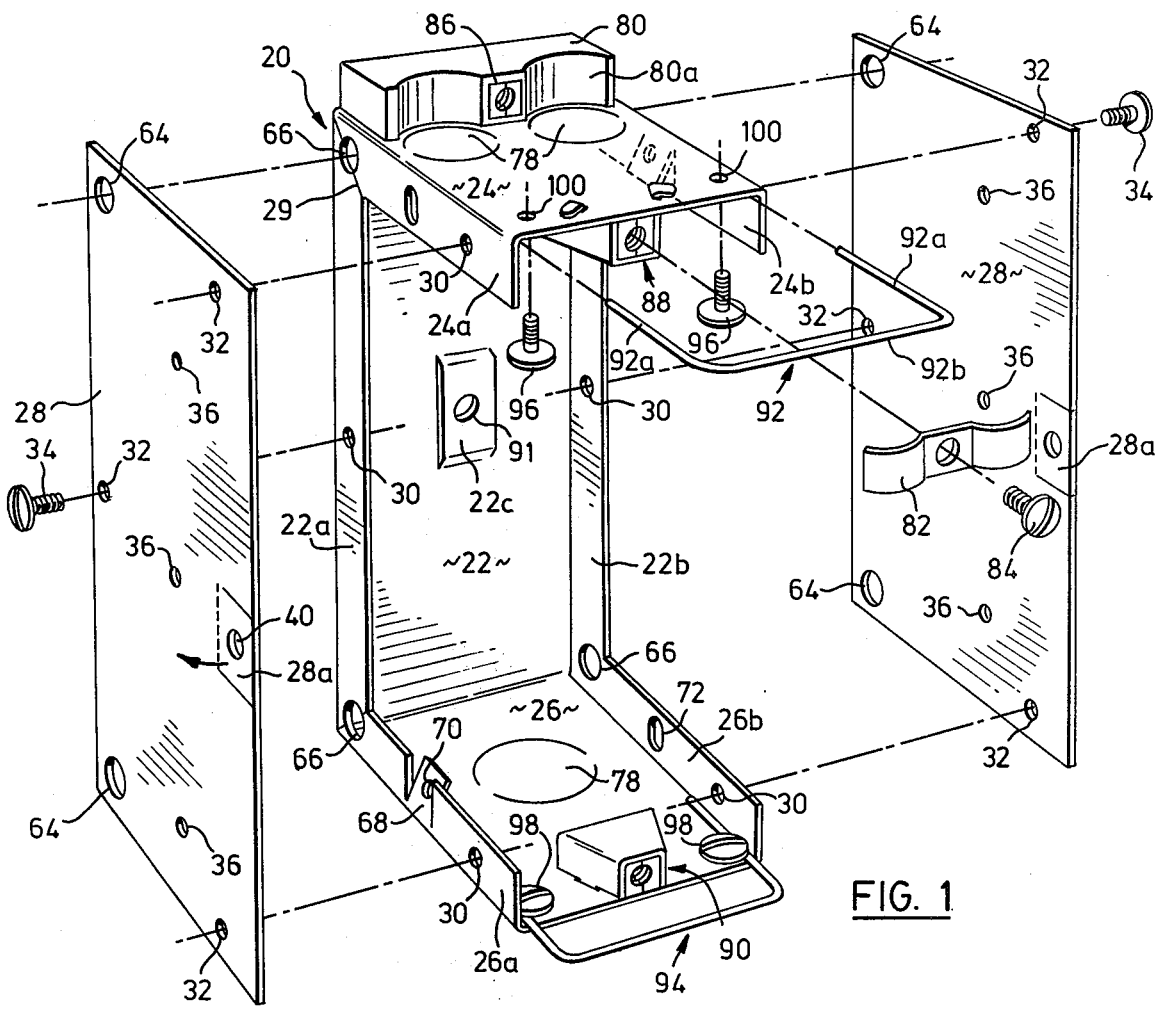
FIG. 1 is an exploded perspective view of an electrical box according to the invention.

Referring first to FIG. 1, the box includes a base member generally indicated at 20 shaped to define a back wall 22, and top and bottom walls 24 and 26 respectively formed integrally with the back wall and extending outwardly from said wall generally normal thereto. Two plain rectangular side plates for forming sides of the box are shown in exploded positions at 28. The plates are identical to one another and are interchangeable. Each of the back wall 22 and the top and bottom walls 24 and 26 has inwardly directed integral flanges along both sides. The flanges of back wall 22 are denoted 22a and 22b while the corresponding flanges of the top and bottom walls are denoted respectively 24a, 24b and 26a, 26b.

The flanges at each side of member 20 co-operate to define attachment faces for the two side plates. Thus, it will be seen that each flange extends along the full length of the associated wall and that the flanges along the top and bottom walls join the adjacent flanges of the back wall at mitred joint lines. For example, the joint line between flanges 22a and 24a is indicated by reference numeral 29. The flanges are not joined together at these joint lines but merely abut against one another. Thus, member 20 is stamped from a single sheet of metal and bent to the form shown in FIG. 1. The faces defining the mitred joint lines serve as abutments for defining the right angles between the back wall 22 and each of the top and bottom walls 24 and 26. In any event, it will be appreciated that the flanges at each side of the base member co-operate to in effect define a continuous attachment margin for side plates. Each of the side plates is of plain rectangular form and is dimentioned to fit onto the base member so as to substantially completely overlie the flanges. Each flange is formed with a screw-threaded opening which aligns with a corresponding plain opening in the associated side plate for receiving a screw to attach the side plate to the base member. These screw threaded openings are each denoted by reference numeral 30 and the aligned plain openings in the side plates are denoted 32. Two typical examples of screws used to attach the side plates are denoted 34 although it will of course be understood that three such screws will be used for each side plate so the plate will be firmly clamped to all three flanges at the relevant side of the box. In this way, both side plates are rigidly clamped to the base member so as to define an integrated structural box capable of being secured to a support by way of either of said side plates. By way of example, three openings 36 have been shown in each side plate and may be used for receiving a screw, nail or other fastener (not shown) extending outwardly through the plate and into an associated support. These openings could alone be used to secure the box to a support. To provide additional security, however, each of the side plates 28 is provided with a bend out tab denoted 28a disposed in a marginal portion of the plate adjacent its front edge. The tab is defined by upper and lower slits in the plate and by a vertical crease line and will lie in the plane of the plate as shown in FIG. 1 at the time the box is purchased. In the event that the tab is required, it can be bent out as indicated by arrow 38 by the installer using a pair of pliers, so as to extend at right angles to the plane of the plate. An opening 40 is provided in the tab for receiving an attachment screw. Thus, tab 28a can be used together with fasteners extending through openings 36.

Figure 3:
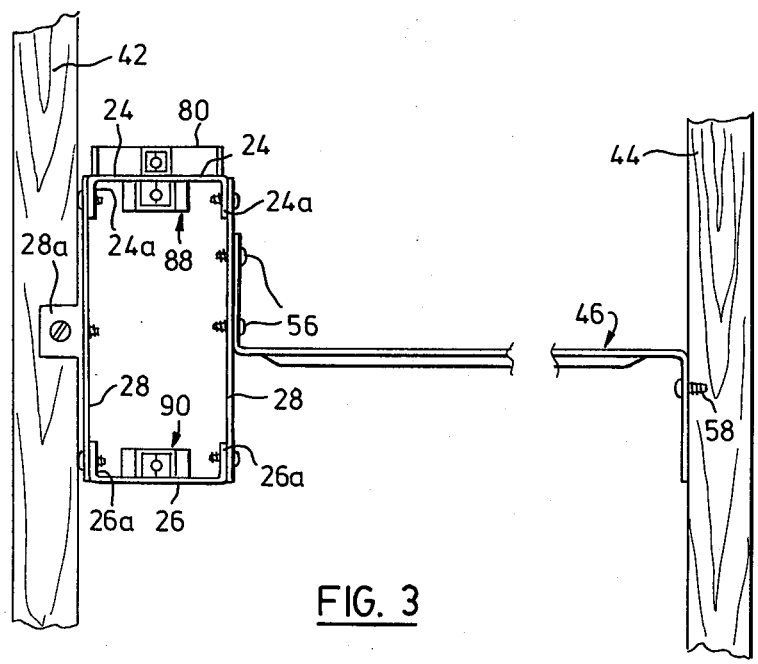
FIG. 3 is a front view illustrating a method of mounting the box of FIG. 1.

FIG. 3 illustrates a further alternative method of mounting the box. In that view, the tab 28a has been used to secure the box alongside a stud 42 and a bracing bar has been used between stud 42 and an adjacent stud 44 and is shown at 46. Bar 46 is shown individually in FIG. 4 and it will be seen that the bar has a main central portion 48 formed with a depression 50 defining a strengthening rib and having attachment portions 52 and 54 at opposite ends formed with openings for receiving screws. The bar will be sold with portion 52 bent at right angles to the remainder of the bar as shown but with portion 54 disposed in the same plane as the remainder of the bar. Portion 52 can then be attached to the box as shown in FIG. 3 using two screws 56 engaged in two of the openings 36. Portion 54 of bar 46 will then be bent to the appropriate position using a pair of pliers and secured to stud 44 by a suitable screw or nail as indicated at 58. This mounting method will probably used mostly where the box is to be mounted on metal studs, in which case the two mounting screws will be self-tapping or self drilling screws. However, the same mounting method could of course be used with wooden studs.

Figure 5:
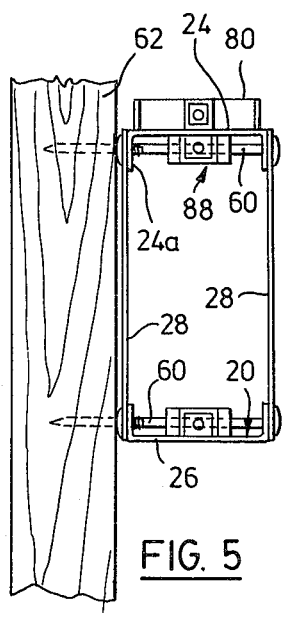
FIG. 5 is a view similar to FIG. 3 illustrating an alternative mounting method; and, FIG. 6 is a side view showing the box of FIG. 1 mounted behind a drywall panel and having a receptacle attached thereto.

FIG. 5 illustrates a still further alternative method of mounting the box which will be particularly appropriate where wooden studs are available. Thus, it will be seen in FIG. 5 that two relatively long nails 68 have been driven right through the box into the stud 62. This mounting method will be generally in accordance with conventional methods used with existing electrical boxes. Referring back to FIG. 1, each of the side plates is formed in its upper and lower rear corners with openings 64 dimensioned to receive nails such as those indicated in FIG. 5. Aligned openings are provided in the flanges of base member 20 and are indicated at 66.

It will be appreciated from the foregoing that the box provided by the invention not only has the advantages of structural strength as discussed previously but also offers the facility for many different mounting methods.

FIG. 2 illustrates a further advantageous feature of the invention which allows boxes to be "ganged" or mounted side by side to form composite box structures of increased width. In that view, the base member 20 of FIG. 1 is shown disposed side by side with a second similar base member denoted 20'. The two base members are firmly secured together by screws to form a composition structure having outstanding rigidity. This is achieved by providing in the flange at one side of the bottom wall of the base member and in the flange at the opposite side of the top wall, a tab portion which is inwardly inclined with respect to the remainder of the flange and is formed with a screw threaded opening for permitting that flange to be secured by a screw in abutting relationship with a flange on an adjacent base member.

As seen in FIG. 2, the flange 26a of the bottom wall 26 of base member 20 is formed with the said tab portion, denoted 68. A screw threaded opening in tab portion 68 is indicated at 70. The flange 26b at the other side of the bottom wall 26 has no such tab but is formed with an opening 72 which is elongated in the direction generally normal to wall 26. The adjacent base member 20' is identical and its tab portion is indicated at 68'. Thus, a screw 74 can be inserted through opening 72 and screwed into the opening in tab portion 68'. The fact that the tab portion 68' is inwardly inclined, coupled with the elongation of opening 72 allows the screw 74 to be inserted at an angle with respect to the bottom wall 26 of member 20 sufficient to allow a screw driver 76 for turning screw 74 to clear flange 26a. Screw 74 can then be tightened firmly against the inner face of flange 26b for securely clamping the two base members together. Although not visible in the drawings, a similar inwardly directed tab portion is provided in the flange 24b at the opposite side of top wall 24 so that the top wall flanges of the adjacent base members can also be clamped together in similar fashion.

Referring back to FIG. 1, it will be seen that the top and bottom walls 24 and 26 of the box are formed with the usual knock-outs, indicated at 78, for permitting electrical wiring to be led into the box. A cable clamp arrangement is provided in association with a knock-out 78 in the top wall 24. This clamp takes the form of a fixed clamp member 80 permanently secured to top wall 24, and a movable clamp plate 82 shown in an exploded position in FIG. 1. Member 80 is formed with recessed face portions 80a adjacent the knock-outs 78, which provide seating surfaces against which cables can be clamped. Plate 82 is also shaped to fit neatly over the cables without trapping the same and is adapted to be secured to member 80 by a screw 84. The members 80 and 82 are made of a suitable rigid plastic material so as to avoid any possibility of short circuits. Screw 84 is received in a screw threaded opening 86 in member 80. This opening may be defined by wedge shaped members which are spring biased towards one another but which can move apart to permit rapid insertion of screw 84 generally in the manner disclosed in my U.S. Pat. No. 4,071,158. Two similar screw fastening devices 88 and 90 are provided on the inner surfaces of the walls 24 and 26 for securing a receptacle to the box as will be more specifically described later.

The box also includes the usual screw threaded opening for receiving a ground screw. This opening is provided in the back wall 22 of base member 20 and is indicated by reference numeral 91. In contrast to prior art boxes, however, opening 91 is formed in a portion 22c of back wall 22 which is inwardly displaced with respect to the remainder of the wall so as to provide clearance to prevent the ground screw projecting to any substantial extent beyond the rear surface of back wall 22. The intention is that a relatively short ground screw will be provided with the box so that, when one or two turns of ground wire have been placed around the screw, its shank will not project beyond the back wall. Portion 22a of back wall 22 is formed during manufacture by providing two parallel slits in the wall on opposite sides of opening 91 and inwardly deforming the metal between the slits.

As indicated previously, the box provided by the invention has the additional feature of adjustable positioning means on each of the top and bottom wall of the box for spacing an electrical receptacle from the outer edges of those walls. In the embodiment shown in FIG. 1, these positioning means take the form of U-shaped spacer elements and associated clamping screws for adjustably securing the elements to the appropriate walls of the box. The spacer element associated with the top wall 24 is denoted by reference numeral 92 and the corresponding element for wall 26 is denoted 94. Two clamping screws for element 92 are indicated at 96 and the corresponding two screws for element 94 are denoted 98. Each element 92 includes two generally parallel side limbs 92a and a base limb 92b extending between outer ends of limbs 92a. The element 92 is dimensioned so that the side limbs 92a fit snugly just inside the side flanges 24a and 24b of top wall 24. The two clamping screws 96 have relatively large diameter heads and are received in screw threaded openings 100 in top wall 24 so that the limbs 92a of element 92 pass below the heads of the screws and are trapped between the screws and the flanges 24a, 24b. Thus, by tightening the screws 96, the limbs 92a can be clamped to the under surface of top wall 24. Further, the extent to which element 92 protrudes from top wall 24 can be readily adjusted by slackening the screws 96, adjusting the position of element 92, and retightening the screws.

Spacer element 94 associated with bottom wall 26 is essentially the same as element 92 and is adjustably secured in place in the same manner. In fact, the feature described above whereby the spacer element is clamped to the inner surface of the wall by the associated clamping screws is best illustrated with reference to element 94 and screws 98.

FIG. 6 shows an electrical receptacle secured to the box. The receptacle itself is denoted 100 and includes conventional mounting tabs 102 and 104 receiving screws 106 and 108 respectively for attaching the receptacle to the box. Two screws extend through the tabs 102 and 104 and are received in the screw fastening devices 88 and 90 respectively. As indicated previously, the screw fastening devices are of the form disclosed in my United States patent referred to above; they will not therefore be described in detail here. For present purposes, it is sufficient to note that, by turning the screws 106 and 108, receptacle 100 is drawn towards the box. The two spacer elements 92 and 94 are also visible in side view in FIG. 6 and are shown projecting from the box and forming abutments against which the mounting tabs 102, 104 of receptacle 100 will abut as the screws 106 and 108 are tightened. The spacer elements will be adjusted with respect to the box before the receptacle is in place so as define the innermost positions to which the receptacle is to be allowed to move when its mounting screws are tight. In the particular embodiment shown in FIG. 6, these positions would be such that the outer limbs of the spacer elements would be flush with the outer surface of the drywall panel indicated at 110. Receptacle 100 would then be attached to the box by engaging the screws 106, 108 in screw fastening devices 88, 90 and the screws will be tightened until the mounting tabs of the receptacle abut against the spacer elements. The screws will then be finally tightened to in effect clamp the tabs against those elements and firmly secure the receptacle in position. This arrangement will have the further advantage that positive electrical connection will be provided between the tabs 102, 104 and the box for grounding purposes.

It will of course be appreciated that the preceding description relates to a specific embodiment of the invention and that many modifications are possible within the scope of the invention. For example, referring to the flanges on the top, bottom and back walls of the box, it will be appreciated that they need not extend over the complete length of each wall. Partial flanges may be sufficient in some cases, provided a reasonable flange area is provided for defining an attachment face for the associated side plate. In regard to the spacer elements 92 and 94, it will be appreciated that elements other than of the specific form illustrated may be employed. For example, in another embodiment, the U-shaped elements 92 and 94 could be replaced by rectangular plates slidably mounted on the external surfaces of the top and bottom walls of the box and formed with longitudinally extending slots for receiving clamping screws to adjustably clamp the plates to the box.

Finally, it is to noted that the terms "top", "bottom", "back" and "side" as used in this application refer to the box in the orientation in which it is shown in the drawings. In fact, the top and bottom walls of the box are identical with one another and the box may be mounted with either wall uppermost, or even with the back wall 22 uppermost and horizontally disposed, e.g. in a specific application requiring a downwardly facing box. Also, the term "electrical box" is to be interpreted broadly as including boxes for electrical use generally, whether for receiving fixtures such as receptacles or for other uses, e.g. as junction boxes.

I claim:

1. An electrical box adapted to be secured side by side with other similar boxes and comprising: a base member shaped to define a back wall, and top and bottom walls formed integrally with the back wall and extending outwardly from said back wall generally normal thereto; and two initially separate, plain rectangular side plates for forming sides of said box; wherein each of said walls has inwardly directed integral flanges along both sides of said base member and the flanges of the respective walls at each side of the base member cooperate to define attachment faces for the relevant said side plate, wherein each of said flanges is formed with at least one screw threaded opening which aligns with a corresponding plain opening in the relevant side plate and which receives a screw rigidly clamping the side plate to the flange, whereby the side plates and base member together define an integrated structural box capable of being secured to a support by way of either of said side plates, and wherein one of said flanges on the bottom wall of the box and the flange at the opposite side of the top wall of the box each include a tab portion which is inwardly inclined with respect to the remainder of the flange and which is formed with a screw threaded opening, and wherein each of the other flanges on said top and bottom wall is formed with a plain opening which is elongated in a direction generally normal to said wall at a position to correspond with the opening in said tab portion so that, when said base member is positioned side by side with a second similar member, the abutting top and bottom wall flanges of the two members can be secured together by two screws, each inserted through one of said elongated plain openings of one member and engaged in the tab opening of the adjacent member and tightened to clamp said members together.

2. A box as claimed in claim 1, wherein each said flange extends along the entire length of the associated wall and the flanges on the top and bottom walls meet the flanges on the back wall at mitred edges.

3. A box as claimed in claim 2, wherein said side plates and flanges are formed with aligned clearance openings positioned so that two nails can be inserted through said openings and through the box from side to side in each of top and bottom corners of the box defined between said back wall and each of said top and bottom walls.

4. A box as claimed in claim 1, wherein said back wall of the base member is provided with a screw threaded opening for receiving a ground screw, and wherein a portion of said wall surrounding said opening is inwardly displaced with respect to the remainder of the wall so as to provide clearance for the shank of the screw at the outer side of said wall.

5. A box as claimed in claim 1, wherein each of said plates is formed in a marginal portion thereof adjacent a front edge with a tab portion which initially disposed in the same plane as the remainder of the plate, but which can be bent outwardly at right angles to the remainder of the plate so as to form a tab for use in attaching the box to a support.

6. A box as claimed in claim 1, further comprising means on each of said top and bottom walls for receiving a screw to secure an electrical receptacle and the like between said walls, and adjustable positioning means on each of said top and bottom walls for spacing said receptacle and the like from said top and bottom walls, each said positioning means comprising a spacer element extending outwardly from the relevant wall of the box and presenting an end face disposed generally parallel to an outer edge of said wall, against which a receptacle and the like abuts when secured to the box by said means for receiving a screw, and means adjustably clamping said element to said wall so that the position of said end face of the element can be adjusted with respect to said wall for appropriately positioning the receptacle.

* * * * *